(12) United States Patent
Choi et al.

(10) Patent No.: US 10,381,679 B2
(45) Date of Patent: Aug. 13, 2019

(54) BATTERY MODULE ARRAY

(71) Applicant: LG CHEM, LTD., Seoul (KR)

(72) Inventors: Jong-Woon Choi, Daejeon (KR);
Jeong-O Mun, Daejeon (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 200 days.

(21) Appl. No.: 14/897,517

(22) PCT Filed: Apr. 1, 2015

(86) PCT No.: PCT/KR2015/003265
§ 371 (c)(1),
(2) Date: Dec. 10, 2015

(87) PCT Pub. No.: WO2015/152639
PCT Pub. Date: Oct. 8, 2015

(65) Prior Publication Data
US 2016/0141712 A1   May 19, 2016

(30) Foreign Application Priority Data

Apr. 3, 2014 (KR) .................. 10-2014-0039962
Apr. 3, 2014 (KR) .................. 10-2014-0039963

(51) Int. Cl.
| | | |
|---|---|---|
| *H01M 10/00* | (2006.01) | |
| *H01M 10/04* | (2006.01) | |
| *H01M 2/10* | (2006.01) | |
| *H01M 2/20* | (2006.01) | |
| *H01M 10/48* | (2006.01) | |
| *H01M 10/647* | (2014.01) | |
| *H01M 10/6551* | (2014.01) | |
| *H01M 10/6555* | (2014.01) | |

(Continued)

(52) U.S. Cl.
CPC ..... *H01M 10/0481* (2013.01); *H01M 2/0275* (2013.01); *H01M 2/1016* (2013.01);
(Continued)

(58) Field of Classification Search
CPC .......... H01M 10/0481; H01M 10/425; H01M 10/6551; H01M 10/647; H01M 2/1016;
(Continued)

(56) References Cited

U.S. PATENT DOCUMENTS 8,399,119 B2   3/2013   Koetting et al.
8,455,122 B2   6/2013   Shin et al.
(Continued)

FOREIGN PATENT DOCUMENTS

CN   101395737 A   3/2009
CN   102822687 A   12/2012
(Continued)

OTHER PUBLICATIONS

International Search Report, issued in PCT/KR2015/003265, dated Jul. 29, 2015.

*Primary Examiner* — Nicholas P D'Aniello
(74) *Attorney, Agent, or Firm* — Birch, Stewart, Kolasch & Birch, LLP

(57) ABSTRACT

Disclosed is a battery module array including battery modules, which may have improved space utilization. The battery module array includes a plurality of battery modules, each having two secondary battery cells, a module frame and a cooling fin. If the battery module array is configured using the above battery modules, space utilization may be improved.

16 Claims, 16 Drawing Sheets

(51) Int. Cl.
  *H01M 10/613* (2014.01)
  *H01M 10/42* (2006.01)
  *H02J 7/00* (2006.01)
  *H01M 2/02* (2006.01)
  *H01M 10/653* (2014.01)

(52) U.S. Cl.
  CPC .......... *H01M 2/202* (2013.01); *H01M 10/425* (2013.01); *H01M 10/482* (2013.01); *H01M 10/613* (2015.04); *H01M 10/647* (2015.04); *H01M 10/6551* (2015.04); *H01M 10/6555* (2015.04); *H02J 7/0052* (2013.01); *H01M 2/1077* (2013.01); *H01M 2/206* (2013.01); *H01M 10/653* (2015.04); *H01M 2010/4271* (2013.01); *H01M 2220/10* (2013.01); *H01M 2220/20* (2013.01); *H01M 2220/30* (2013.01)

(58) Field of Classification Search
  CPC .......... H01M 10/6555; H01M 10/482; H01M 2010/4271; H01M 10/653; H01M 2/1077
  See application file for complete search history.

(56) References Cited

U.S. PATENT DOCUMENTS

| | | | |
|---|---|---|---|
| 2010/0316906 A1* | 12/2010 | Nansaka | H01M 2/0262 429/181 |
| 2011/0024205 A1 | 2/2011 | Nishihara et al. | |
| 2011/0059342 A1* | 3/2011 | Lee | H01M 2/1077 429/93 |
| 2012/0088135 A1 | 4/2012 | Kim et al. | |
| 2012/0115011 A1 | 5/2012 | Kim | |
| 2012/0313559 A1 | 12/2012 | Tonomura et al. | |
| 2013/0078487 A1* | 3/2013 | Shin | H01M 10/482 429/62 |
| 2013/0177790 A1 | 7/2013 | Yang et al. | |
| 2013/0330584 A1 | 12/2013 | Lee et al. | |
| 2014/0087221 A1 | 3/2014 | Kim et al. | |
| 2014/0242429 A1 | 8/2014 | Lee et al. | |
| 2015/0140408 A1 | 5/2015 | Hayashida et al. | |
| 2015/0162648 A1 | 6/2015 | Yang et al. | |

FOREIGN PATENT DOCUMENTS

| | | | | |
|---|---|---|---|---|
| CN | 102881846 A | 1/2013 | | |
| JP | 2009/266773 A | 11/2009 | | |
| JP | 2011-49158 A | 3/2011 | | |
| JP | 2013-503432 A | 1/2013 | | |
| JP | 2013/225457 A | 10/2013 | | |
| JP | 2014/010984 A | 1/2014 | | |
| KR | 10-2011-0030352 A | 3/2011 | | |
| KR | 10-2011-0059356 A | 6/2011 | | |
| KR | 10-2012-0047800 A | 5/2012 | | |
| KR | 10-2012-0126893 A | 11/2012 | | |
| WO | WO-2011126315 A2 * | 10/2011 | .......... | H01M 10/482 |
| WO | WO 2012/090340 A1 | 7/2012 | | |
| WO | WO 2013/111960 A1 | 8/2013 | | |
| WO | WO 2013/179797 A1 | 12/2013 | | |

* cited by examiner

BATTERY MODULE ARRAY

TECHNICAL FIELD

The present disclosure relates to a battery module array, and more particularly, to a battery module array including battery modules, which may have improved space utilization.

The present application claims priority to Korean Patent Application No. 10-2014-0039962 filed on Apr. 3, 2014 and Korean Patent Application No. 10-2014-0039963 filed on Apr. 3, 2014 in the Republic of Korea, the disclosures of which are incorporated herein by reference.

BACKGROUND ART

A secondary battery having good application to various product groups and good electric characteristics such as high energy density is widely applied to not only portable devices but also an electric vehicle (EV) or a hybrid electric vehicle (HEV) driven by an electric driving source. The secondary battery has a primary advantage of greatly reducing the use of fossil fuels and a secondary advantage of generating no byproduct in use of energy, and thus attracts attention as a new energy source for enhancing environment-friendly and energy-efficient properties.

Lithium ion batteries, lithium polymer batteries, nickel cadmium batteries, nickel hydrogen batteries, nickel zinc batteries or the like are widely used as secondary batteries at the present. Such a unit secondary battery cell has an operating voltage of about 2.5V to 4.2V. Therefore, if a higher output voltage is demanded, a plurality of secondary battery cells may be connected in series to configure a battery pack. In addition, according to a charge/discharge capacity demanded to the battery pack, a plurality of secondary battery cells may also be connected in parallel to configure a battery pack. Therefore, the number of secondary battery cells included in the battery pack may be various set depending on a demanded output voltage or charge/discharge capacity.

Meanwhile, if a plurality of secondary battery cells is connected in series or in parallel to configure a battery pack, in general cases, two or more secondary battery cells are assembled to configure a battery module, a plurality of battery modules is assembled to configure a battery module array, and other components are added to the battery module array, thereby configuring a battery pack. At this time, the shape of the battery module array is determined depending on electric connection or mechanical connection among the plurality of battery modules.

Meanwhile, Korean Unexamined Patent Publication No. 10-2012-0047800 is one of documents disclosing a battery module array and a battery module. In this document, the battery module array is simply expressed as having a box shape, but the entire shape of the battery pack is greatly influenced by the shape of the battery module array. In addition, the shape of the battery module array is greatly influenced by the shape of the battery module. Therefore, there is needed a battery module with good space utilization.

DISCLOSURE

Technical Problem

The present disclosure is designed to solve the problems of the related art, and therefore the present disclosure is directed to providing a battery module array including battery modules, which may have improved space utilization.

Technical Solution

In one aspect of the present disclosure, there is provided a battery module array, which includes a plurality of battery modules, each having two secondary battery cells, a module frame and a cooling fin; end plates provided at both sides of a battery module assembly configured by assembling the plurality of battery modules; a '['-shaped tension bar coming in contact with a top end of the battery module assembly and fixed to the end plates; a sensing line assembly electrically connected to electrode leads of the battery modules included in the battery module assembly; a terminal bus bar configured to electrically connect the electrode leads of the battery modules included in the battery module assembly to each other; a front cover configured to cover a front portion of the battery module assembly not to be exposed outwards; and a rear cover configured to cover a rear portion of the battery module assembly not to be exposed outwards.

According to an embodiment of the present disclosure, the module frame may have a rectangular frame shape, have a slit formed at a bottom surface thereof so that the cooling fin is inserted therein, and be interposed between the two secondary battery cells.

According to an embodiment of the present disclosure, the module frame may have a rectangular frame shape, have a side to which the cooling fin is coupled, and be configured to surround outer surfaces of the two secondary battery cells.

According to an embodiment of the present disclosure, the battery module array may further include an insulation sheet interposed between the battery module assembly and the end plate. Preferably, the insulation sheet may be made of ethylene propylene diene monomer (EPDM) rubber.

According to an embodiment of the present disclosure, the end plate may have a groove in which a thread is formed, the tension bar may have a groove formed at a location corresponding to the groove of the end plate, and the end plate and the tension bar may be fixed to each other by means of a bolt.

According to an embodiment of the present disclosure, the sensing line assembly may include a connector for coupling with an external device.

According to an embodiment of the present disclosure, the front cover may include an electrode terminal electrically connected to the terminal bus bar. In addition, the electrode terminal may be exposed at an outer surface of the front cover.

The battery module array according to the present disclosure may serve as a component of a battery pack, which includes a battery module array and a battery protection circuit.

The battery pack according to the present disclosure may serve as a component of a battery operating system, which includes a battery pack; and a load configured to receive power from the battery pack. At this time, the load may be an electric-driven unit or a portable device.

Advantageous Effects

According to the present disclosure, by configuring a battery module array with two-cell battery modules, it is possible to ensure high space utilization.

In another aspect of the present disclosure, by using standardized two-cell battery modules, it is possible to manufacture battery module arrays with various sizes and various charging/discharging capacity.

In another aspect of the present disclosure, by using a single frame located at the center, serious manufacture costs are not demanded.

In another aspect of the present disclosure, since the module frame is not couple to a cooling fin by means of extrusion, a tolerance may be reduced during a manufacturing procedure. Therefore, in another aspect of the present disclosure, a non-contact area with a secondary battery cell, which may be caused when a cooling fin is bent, may be decreased.

In another aspect of the present disclosure, a bolt or a nut groove may not be separately formed for coupling battery modules with each other, and thus the battery module array may be easily manufactured.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings. In the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
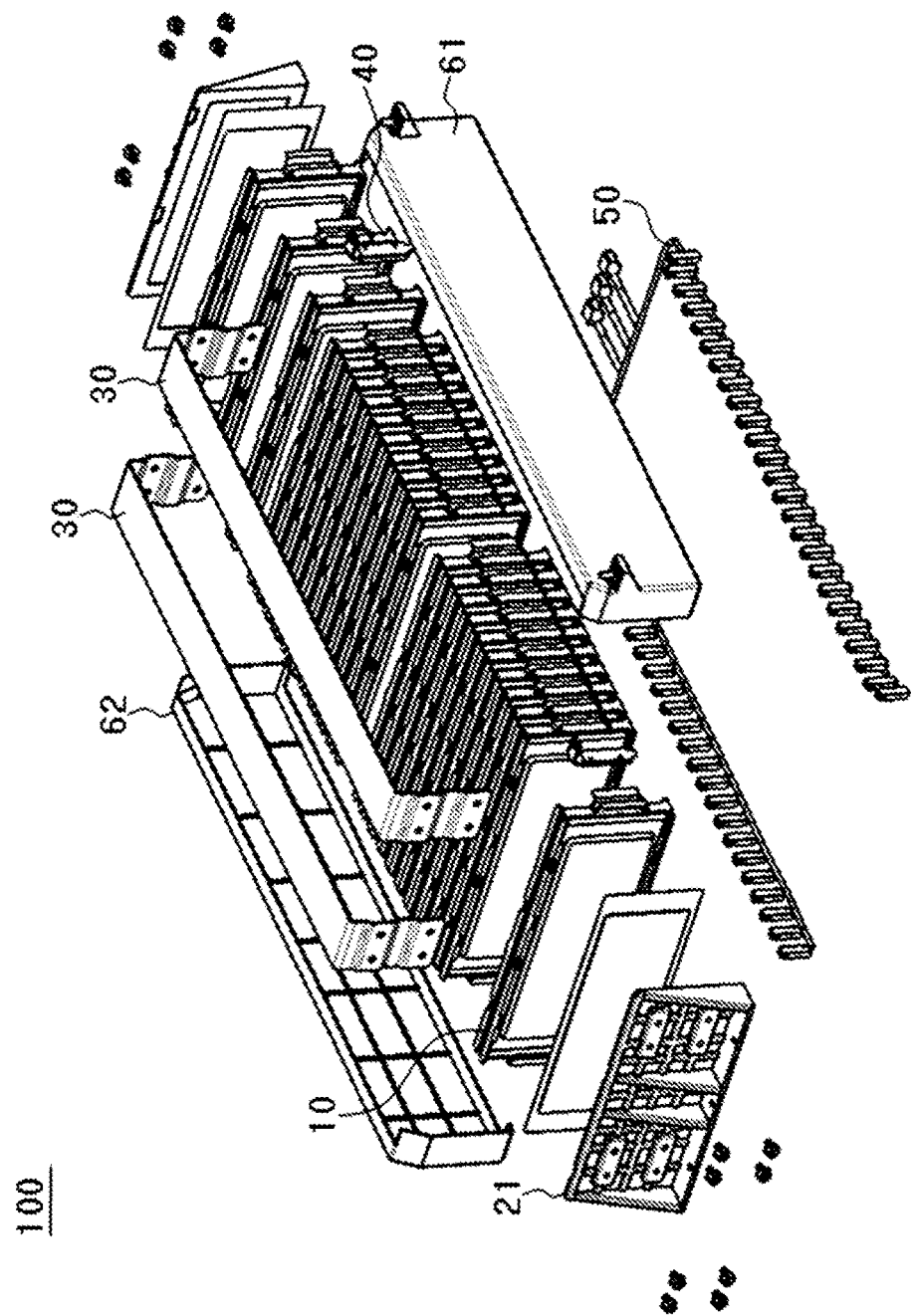
FIG. 1 is an exploded perspective view showing a battery module array according to an embodiment of the present disclosure.

FIG. 1 is an exploded perspective view showing a battery module array according to an embodiment of the present disclosure.

Referring to FIG. 1, a battery module array 100 according to an embodiment of the present disclosure includes a plurality of battery modules 10, two end plates 21, two tension bars 30, a sensing line assembly 50, a terminal bus bar 40, a front cover 61 and a rear cover 62. Hereinafter, the battery module array according to an embodiment of the present disclosure will be described according to an assembling process of the battery module array.

Figure 2:
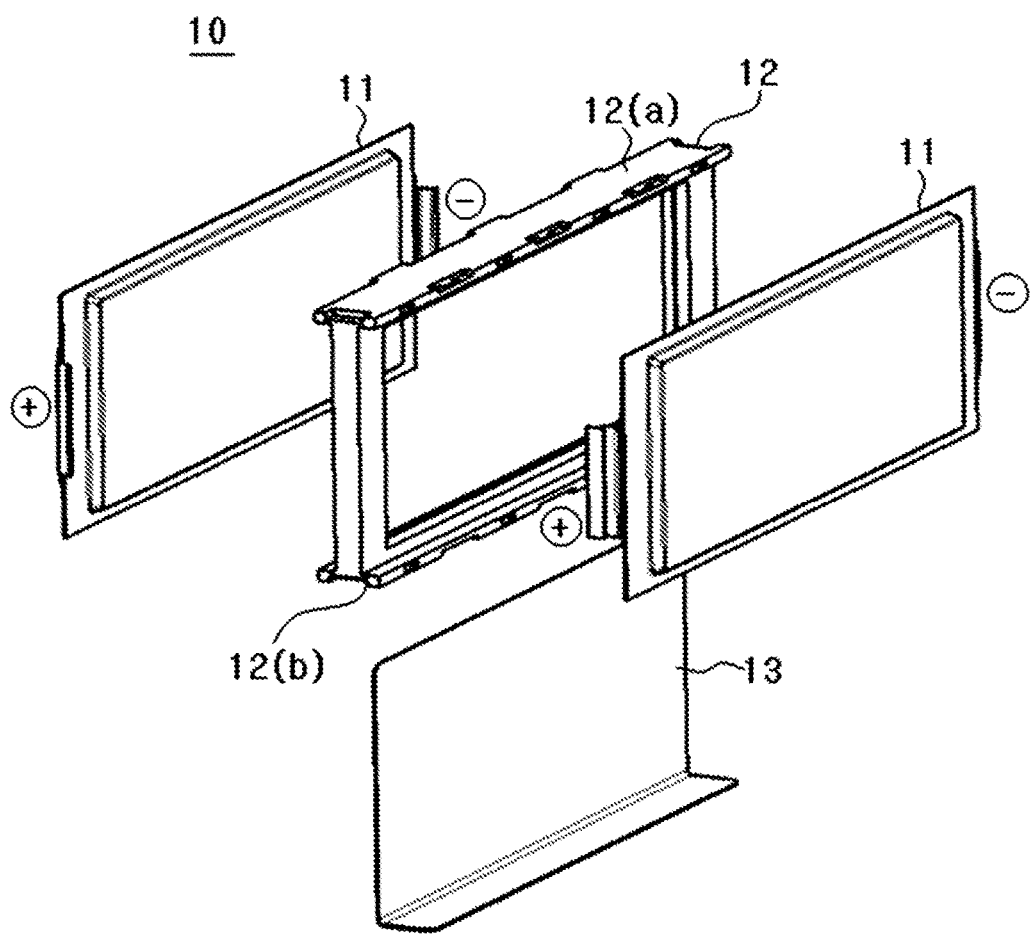
FIG. 2 is an exploded perspective view showing a battery module according to an embodiment of the present disclosure.

FIG. 2 is an exploded perspective view showing a battery module according to an embodiment of the present disclosure.

Referring to FIG. 2, the battery module 10 according to an embodiment of the present disclosure includes two secondary battery cells 11, a module frame 12 and a cooling fin 13.

Here, the secondary battery cell 11 is not specially limited in its kind. Each secondary battery cell 11 may be a lithium ion battery, a lithium polymer battery, a nickel cadmium battery, a nickel hydrogen battery, a nickel zinc battery or the like, which are rechargeable and have appropriate charging and discharging voltages. Preferably, the secondary battery cell 11 may employ a lithium polymer battery. In addition, the secondary battery cell 11 may be classified into pouch-type, cylindrical-type, rectangular-type or the like. Preferably, the secondary battery cell 11 may employ a pouch-type secondary battery cell.

The module frame 12 has a rectangular shape so that the secondary battery cells 11 may be fixed to both sides thereof. In addition, a top surface 12a and a bottom surface 12b of the module frame 12 become a top surface and a bottom surface of the battery module array, which are exposed outwards when the battery module array is configured, and thus may have a flat shape. In addition, the module frame 12 may be shaped to be fixed with an adjacent battery module frame by engagement. In addition, a slit is formed at the bottom surface 12b of the module frame 12 so that cooling fin 13 may be inserted therein. In addition, the module frame 12 may have an opened center (with a rectangular frame shape) so that the cooling fin 13 may come into contact with the secondary battery cell 11. The battery module 10 may also be called a 'central-frame-type two-cell battery module'.

The module frame 12 may be made of polymer material. Preferably the module frame 12 may be made of PA66.

The cooling fin 13 plays a role of emitting heat of the secondary battery cell 11 by means of indirect cooling. Even though FIG. 2 shows that the cooling fin has an 'L' shape, the cooling fin may also have a 'T' shape or an 'I' shape. The cooling fin 13 may be made of metal. Preferably, the cooling fin 13 may be made of aluminum.

Figure 3:
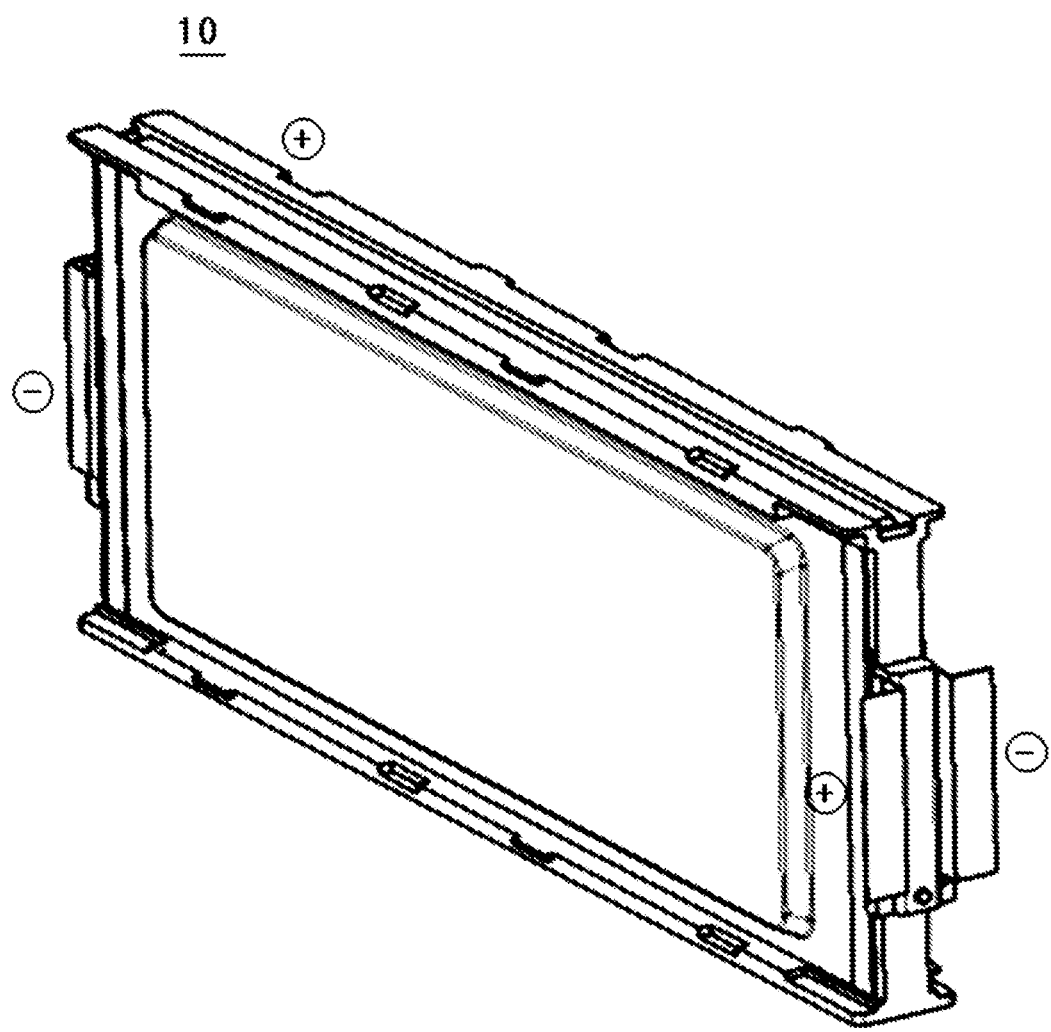
FIG. 3 is a perspective view showing a battery module according to an embodiment of the present disclosure in an assembled state.

FIG. 3 is a perspective view showing a battery module according to an embodiment of the present disclosure in an assembled state.

Referring to FIG. 3, combination relations of the components depicted in FIG. 2 may be understood.

The battery module 10 may be classified into two types. One type is a parallel-type (P-type) module in which electrode leads having the same polarity formed at two secondary battery cells 11 are exposed in the same direction. The other type is a series-type (S-type) module in which electrode leads having the same polarity formed at two secondary battery cells 11 are exposed in different directions. The battery module 10 depicted in FIG. 2 is a P-type module, and the battery module 10 depicted in FIG. 3 is an S-type module.

The battery module array 100 may include any one kind of the parallel-type module and the series-type module, or may include the parallel-type module and the series-type module simultaneously. In addition, the battery module array 100 includes a plurality of battery modules 10. However, in the present disclosure, the number of the battery modules 10 is not specially limited.

Figure 4:
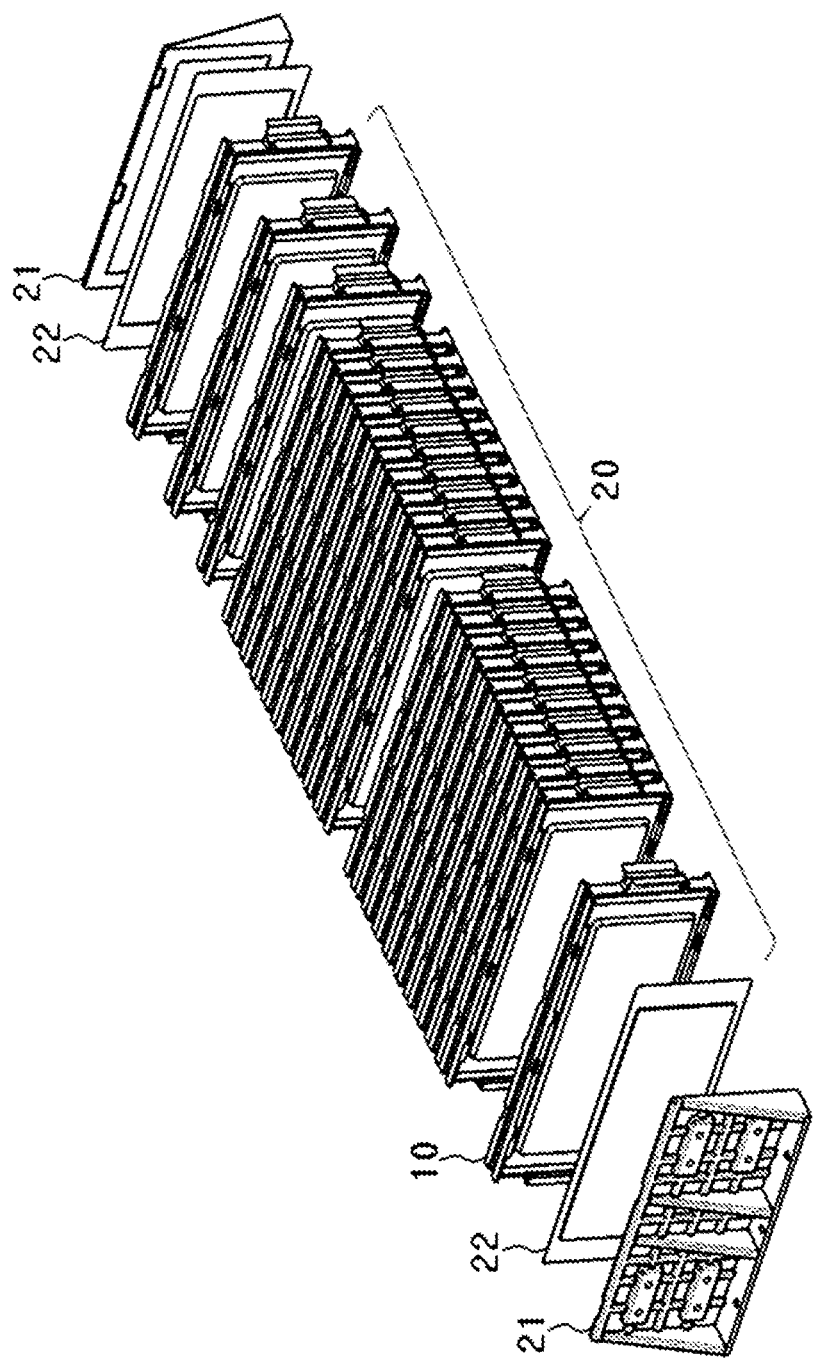
FIG. 4 is a diagram for illustrating a combination relation of a plurality of battery modules and two end plates.

FIG. 4 is a diagram for illustrating a combination relation of a plurality of battery modules and two end plates.

Referring to FIG. 4, it may be found that a plurality of battery modules 10 is assembled. An assembly in which a plurality of battery modules 10 is assembled as above may be called a battery module assembly 20. The two end plates 21 are located at both sides of the battery module assembly 20.

According to an embodiment of the present disclosure, the battery module array may further include an insulation sheet 22 interposed between the battery module assembly 20 and the end plate 21. Two insulation sheets 22 may be provided and respectively interposed between the battery module assembly 20 and two end plates 21. The insulation sheet 21 may be made of polymer material. Preferably, the insulation sheet 21 may be made of ethylene propylene diene monomer (EPDM) rubber.

Figure 5:
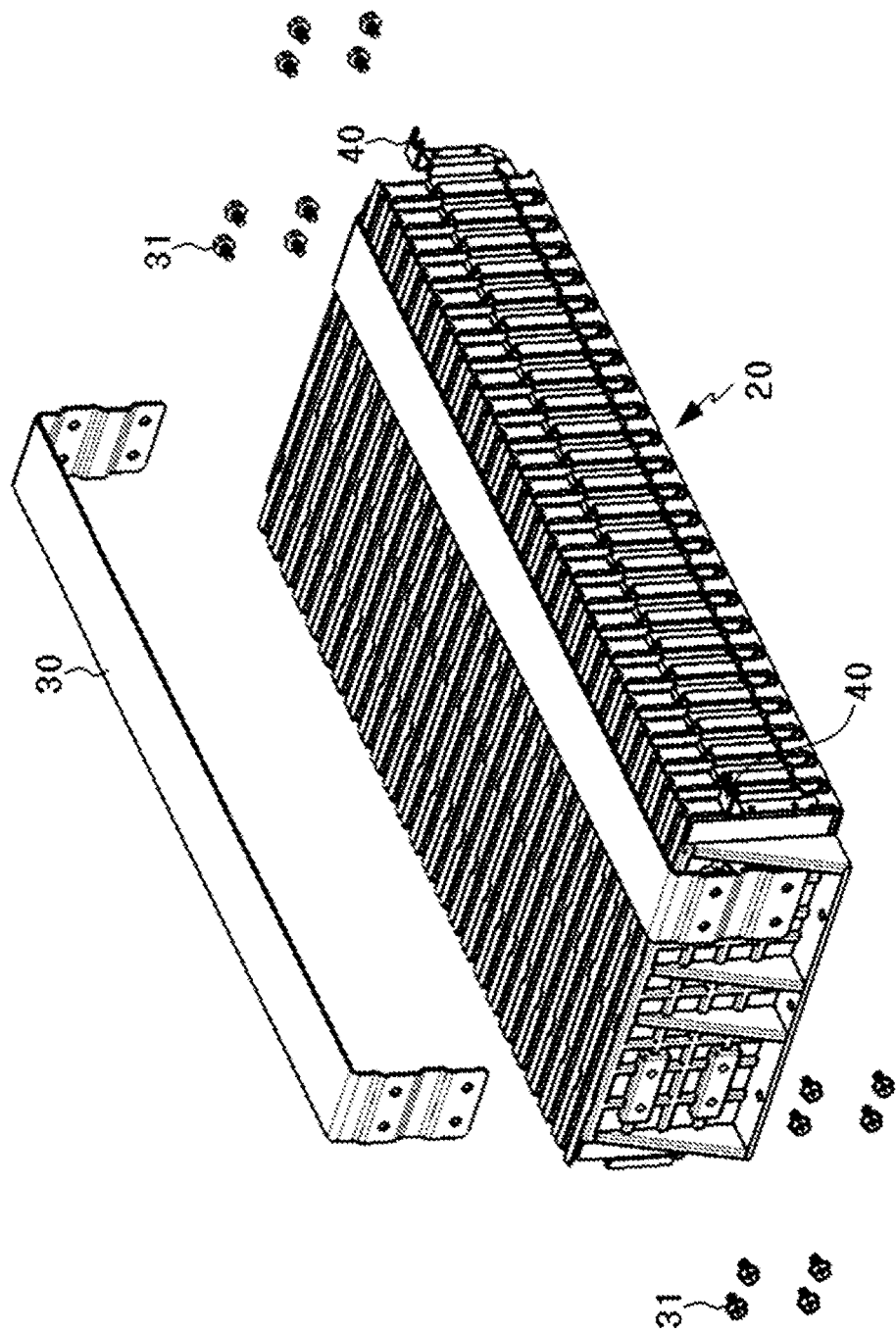
FIG. 5 is a diagram for illustrating a combination relation of a tension bar and a battery module assembly according to an embodiment of the present disclosure.

FIG. 5 is a diagram for illustrating a combination relation of a tension bar and a battery module assembly according to an embodiment of the present disclosure.

Referring to FIG. 5, the two tension bars 30 have a '[' shape. In addition, the two tension bars 30 come into contact with a top end of the battery module assembly 20 and fixed to the end plates 21. As shown in FIG. 5, the tension bar 30 may give a supporting force in a lateral direction perpendicular to the front and rear direction and may also give a supporting force in a downward direction to the top portion. Since a lateral supporting force is provided to the battery module assembly 20 by using the tension bar 30, the battery module assembly 20 may maintain a firm coupled state.

According to an embodiment of the present disclosure, a groove with a thread is formed at the end plate 21. In addition, the tension bar 30 has a groove formed at a location corresponding to the groove of the end plate 21. In addition, the end plate 21 and the tension bar 30 are fixed using a bolt 31. The tension bar 30 plays a role of firmly fixing the structure of the battery module assembly 20.

The terminal bus bar 40 mediates an electric connection between an electrode terminal 63, described later, and the battery module assembly. At this time, the battery modules 10 included in the battery module assembly 20 may be electrically connected to each other through electrode leads.

Figure 6:
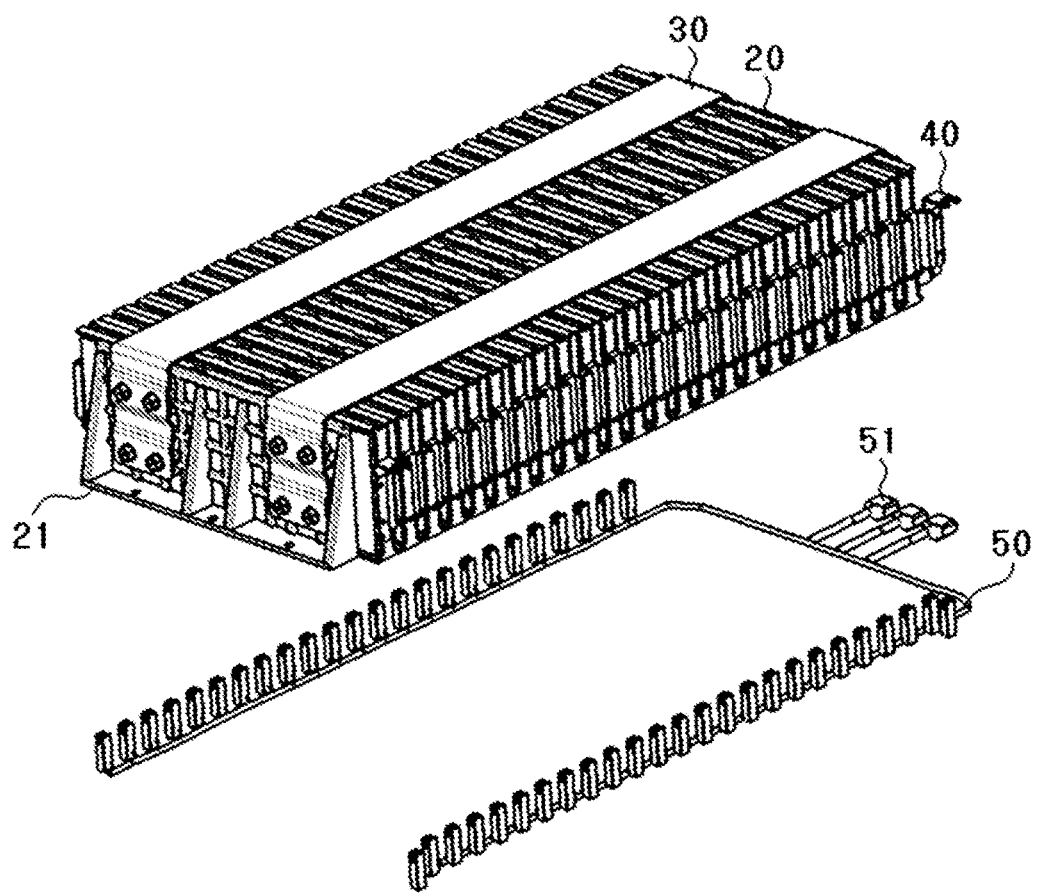
FIG. 6 is a diagram for illustrating a combination relation of a sensing line assembly and a battery module assembly according to an embodiment of the present disclosure.

FIG. 6 is a diagram for illustrating a combination relation of a sensing line assembly and a battery module assembly according to an embodiment of the present disclosure.

Referring to FIG. 6, the sensing line assembly 50 is electrically connected to electrode leads of all battery modules 10 included in the battery module assembly 20.

According to an embodiment of the present disclosure, the sensing line assembly 50 may include a connector 51 for coupling with an external measurement device.

The sensing line assembly 50 is used for an electric connection with a voltage measurement device for measuring a voltage of each battery module 10 included in the battery module assembly 20. The voltage measurement device may be connected through the connector 51, and the voltage measurement device may serve as a battery management system for controlling charge and discharge of the battery module array 100 according to the present disclosure.

Figure 7:
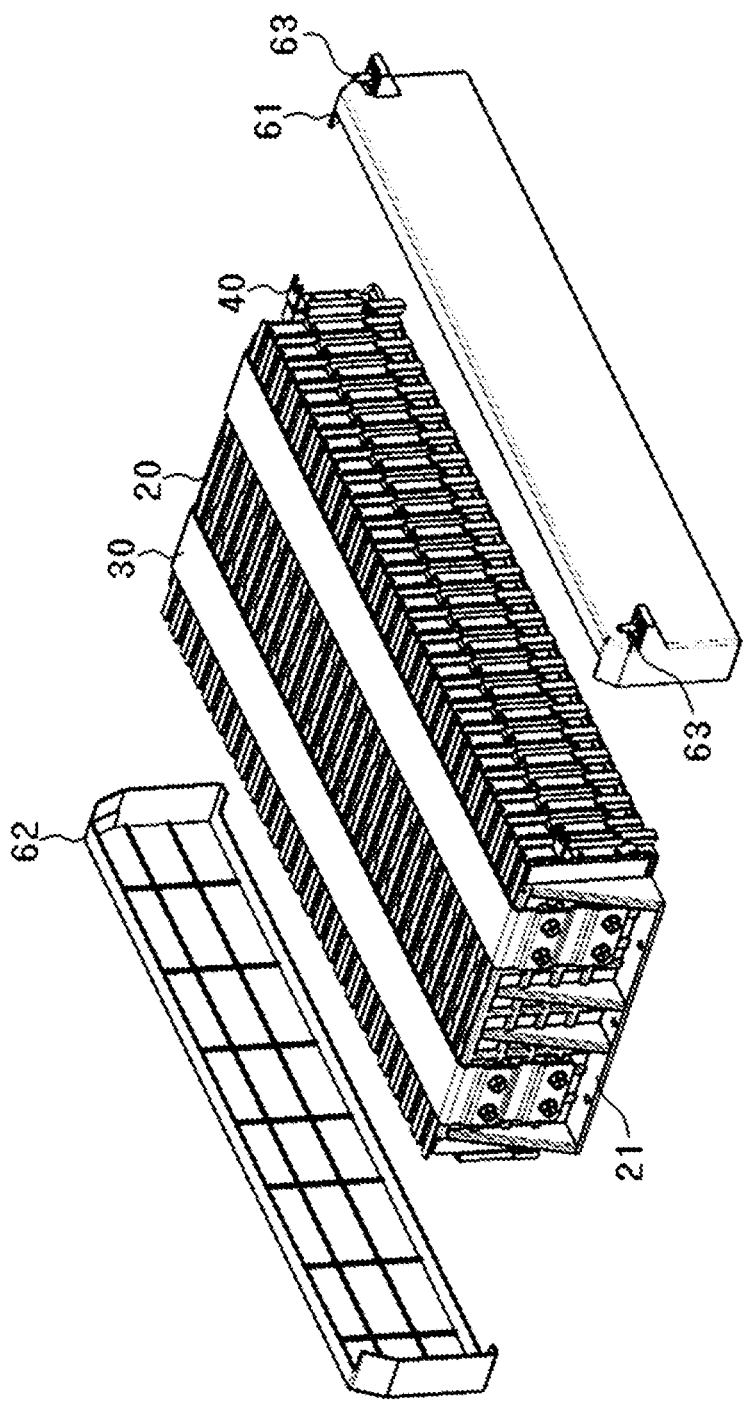
FIG. 7 is a diagram for illustrating a combination relation of a front cover, a rear cover and a battery module assembly according to an embodiment of the present disclosure.

FIG. 7 is a diagram for illustrating a combination relation of a front cover, a rear cover and a battery module assembly according to an embodiment of the present disclosure.

Referring to FIG. 7, the front cover 61 plays a role of covering a front portion of the battery module assembly 20 not to be exposed outwards. In other words, the front cover 61 is disposed at and coupled to the front portion of the battery module assembly 20 so as to cover the front portion of the battery module assembly 20. Similarly, the rear cover 62 plays a role of covering a rear portion of the battery module assembly 20 not to be exposed outwards. In other words, the rear cover 62 is disposed at and coupled to the rear portion of the battery module assembly 20 to cover the rear portion of the battery module assembly 20.

According to an embodiment of the present disclosure, the front cover 61 includes an electrode terminal 63 electrically connected to the terminal bus bar 40. In addition, the electrode terminal 63 is exposed at an outer surface of the front cover 61. The electrode terminal 63 is a terminal connected to an external device for charging or discharging the battery module array 100. A charging or discharging current flows through the electrode terminal 63.

Figure 8:
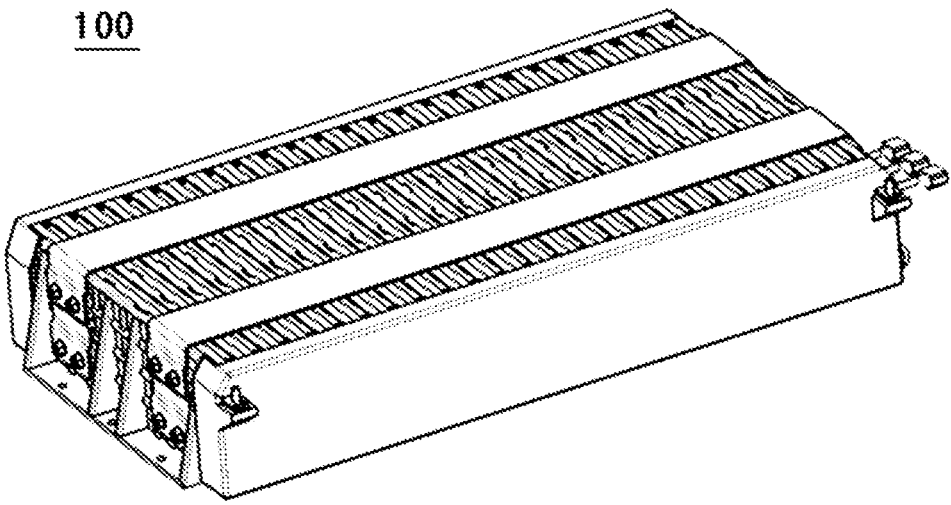
FIG. 8 is a perspective view showing a battery module array according to an embodiment of the present disclosure in an assembled state.

FIG. 8 is a perspective view showing a battery module array according to an embodiment of the present disclosure in an assembled state.

Referring to FIG. 8, a finished configuration of the battery module array 100 according to an embodiment of the present disclosure as described through FIGS. 1 to 7 may be found.

Figure 9:
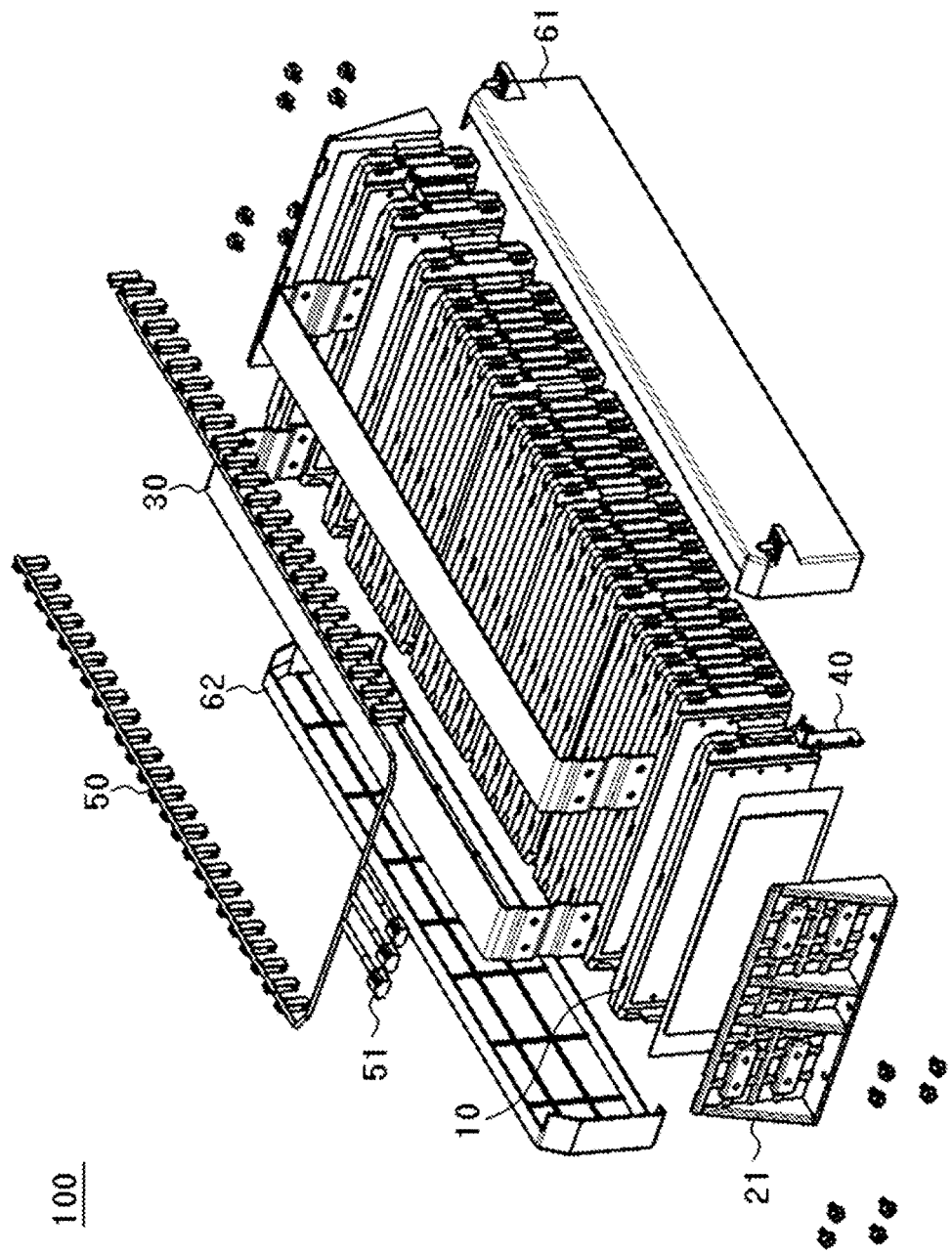
FIG. 9 is an exploded perspective view showing a battery module array according to another embodiment of the present disclosure.

FIG. 9 is an exploded perspective view showing a battery module array according to another embodiment of the present disclosure.

Referring to FIG. 9, a battery module array 100 according to another embodiment of the present disclosure includes a plurality of battery modules 10, two end plates 21, two tension bars 30, a sensing line assembly 50, a terminal bus bar 40, a front cover 61 and a rear cover 62. Hereinafter, the battery module array according to another embodiment of the present disclosure will be described according to an assembling process of the battery module array.

Figure 10:
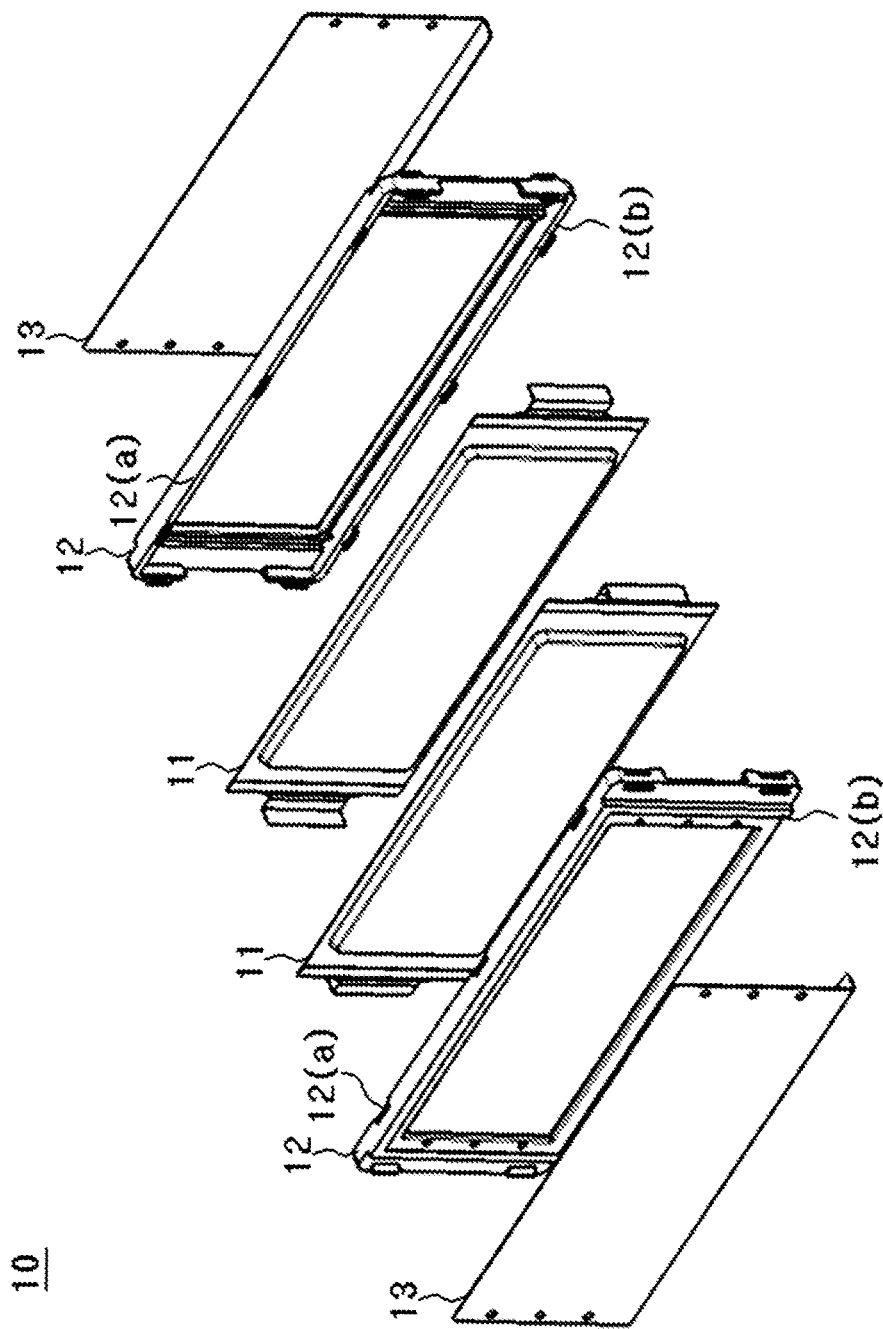
FIG. 10 is an exploded perspective view showing a battery module according to another embodiment of the present disclosure.

FIG. 10 is an exploded perspective view showing a battery module according to another embodiment of the present disclosure.

Referring to FIG. 10, the battery module 10 according to another embodiment of the present disclosure includes two secondary battery cells 11, two module frames 12 and two cooling fins 13.

Here, the secondary battery cell 11 is not specially limited in its kind, as described above.

The two module frames 12 are shaped so that the two cooling fins 13 are coupled to sides thereof. In addition, the two module frames 12 are interposed at outer surfaces of the two secondary battery cells 11. Top surfaces 12a and bottom surfaces 12b of the two module frames 12 become top surfaces and bottom surfaces of the battery module array, which are exposed outwards when the battery module array is configured, and thus may have a flat shape. In addition, the two module frames 12 may be shaped to be fixed with adjacent other battery module frames by engagement. In addition, the two module frames 12 may have opened centers (with a rectangular frame shape) so that the cooling fin 13 may come into contact with the secondary battery cell 11. This battery module 10 may also be called a case-frame-type two-cell battery module'.

The module frame 12 may be made of polymer material. Preferably the module frame 12 may be made of PA66.

The cooling fin 13 plays a role of emitting heat of the secondary battery cell 11 by means of indirect cooling. Even though FIG. 10 shows that the cooling fin has an 'L' shape, the cooling fin may also have a 'T' shape or an 'I' shape. The cooling fin 13 may be made of metal. Preferably, the cooling fin 13 may be made of aluminum.

Figure 11:
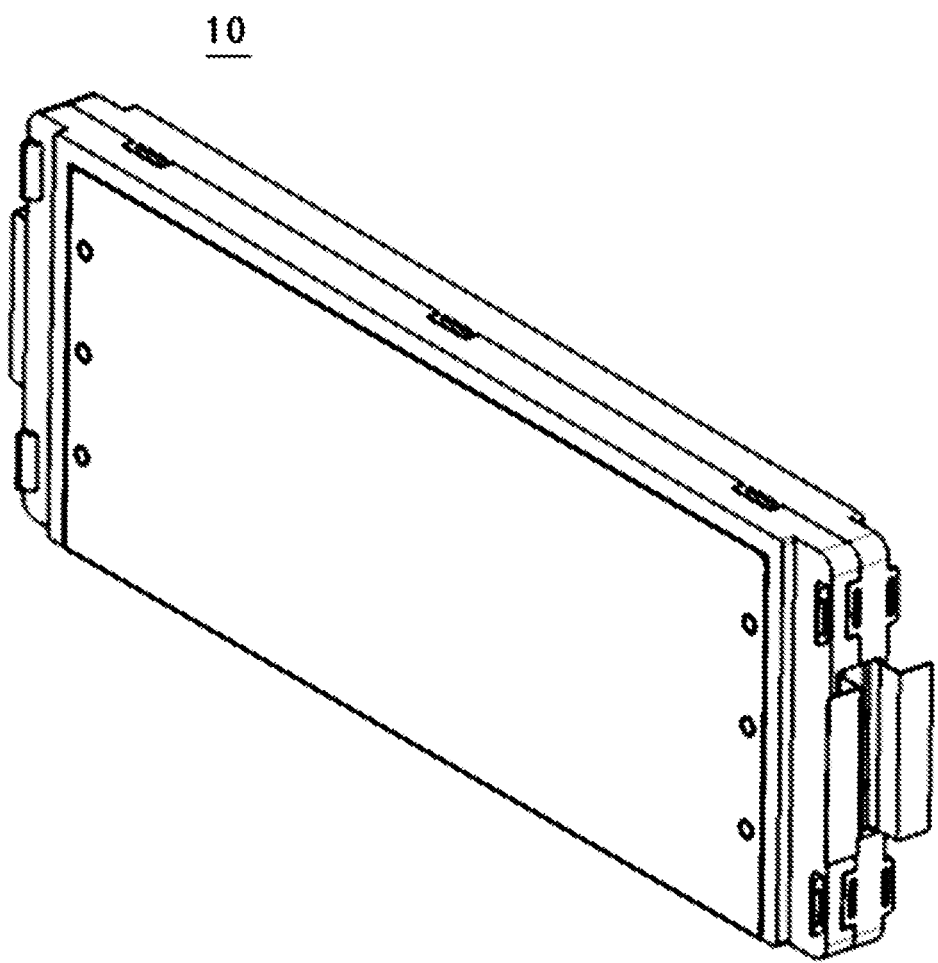
FIG. 11 is a perspective view showing a battery module according to an embodiment of the present disclosure in an assembled state.

FIG. 11 is a perspective view showing a battery module according to an embodiment of the present disclosure in an assembled state.

Referring to FIG. 11, combination relations of the components depicted in FIG. 10 may be understood.

Figure 12:
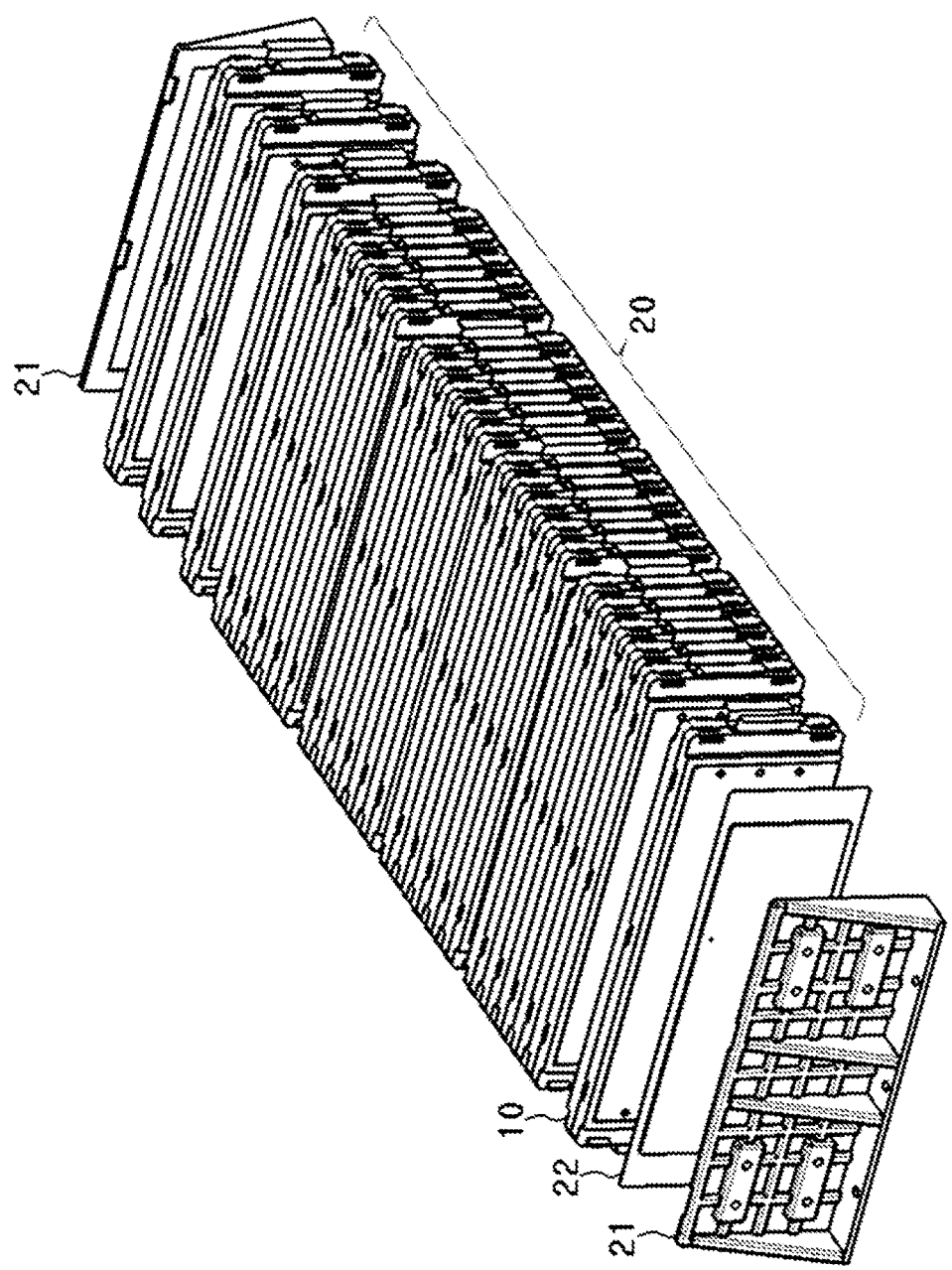
FIG. 12 is a diagram for illustrating a combination relation of a plurality of battery modules and two end plates.

FIG. 12 is a diagram for illustrating a combination relation of a plurality of battery modules and two end plates.

Referring to FIG. 12, it may be found that a plurality of battery modules 10 is assembled in the battery module assembly. The two end plates 21 are located at both sides of the battery module assembly 20.

According to an embodiment of the present disclosure, the battery module array may further include an insulation sheet 22 interposed between the battery module assembly 20 and the end plate 21. Two insulation sheets 22 may be provided and respectively interposed between the battery module assembly 20 and two end plates 21. The insulation sheet 21 may be made of polymer material. Preferably, the insulation sheet 21 may be made of ethylene propylene diene monomer (EPDM) rubber.

Figure 13:
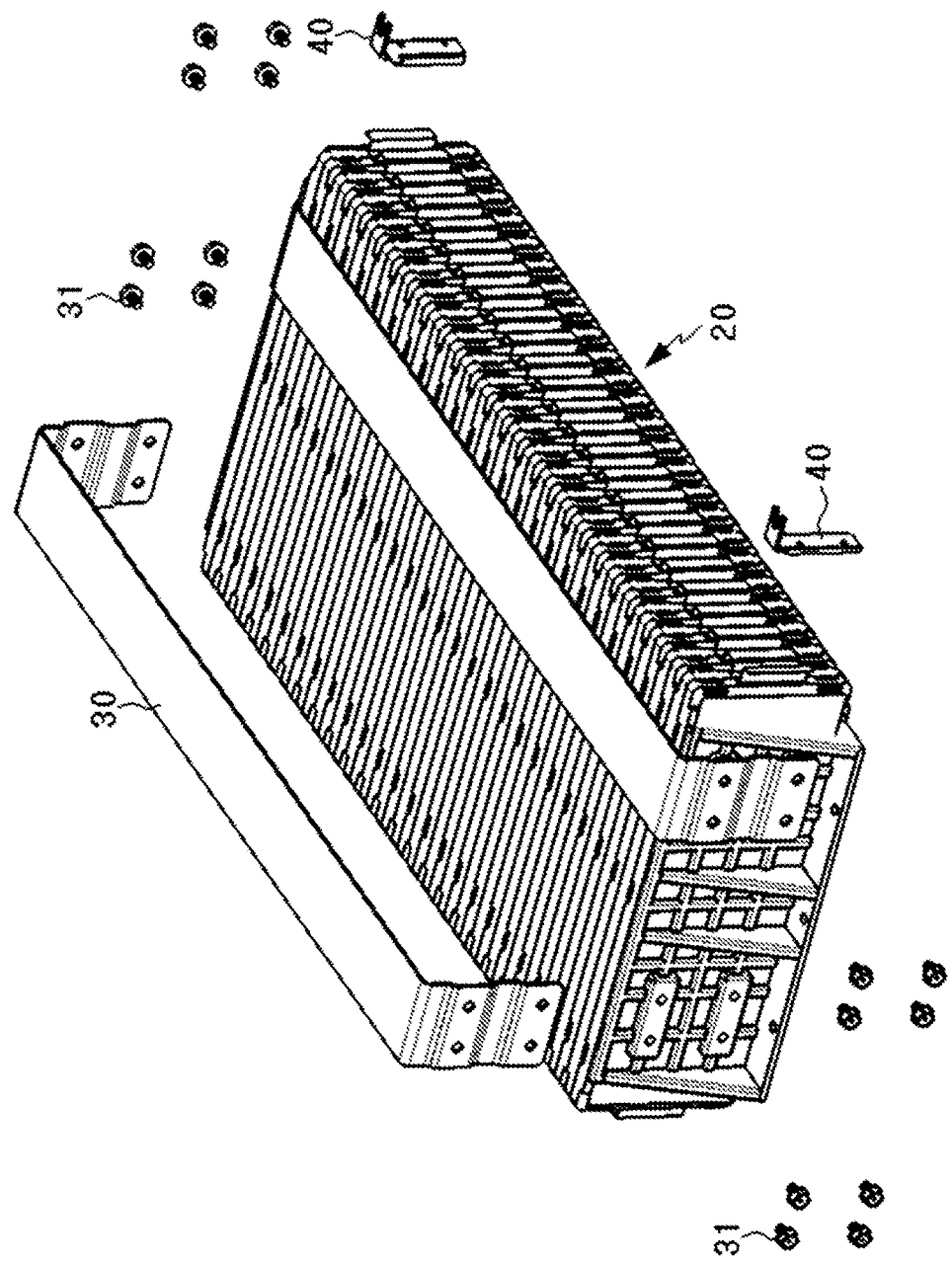
FIG. 13 is a diagram for illustrating a combination relation of a tension bar and a battery module assembly according to another embodiment of the present disclosure.

FIG. 13 is a diagram for illustrating a combination relation of a tension bar and a battery module assembly according to another embodiment of the present disclosure.

Referring to FIG. 13, the two tension bars 30 have a '[' shape. In addition, the two tension bars 30 come into contact with a top end of the battery module assembly 20 and fixed to the end plates 21. As shown in FIG. 13, the tension bar 30 may give a supporting force in a lateral direction perpendicular to the front and rear direction and may also give a supporting force in a downward direction to the top portion. Since a lateral supporting force is provided to the battery module assembly 20 by using the tension bar 30, the battery module assembly 20 may maintain a firm coupled state.

According to an embodiment of the present disclosure, a groove with a thread is formed at the end plate 21. In addition, the tension bar 30 has a groove formed at a location corresponding to the groove of the end plate 21. In addition, the end plate 21 and the tension bar 30 are fixed using a bolt 31. The tension bar 30 plays a role of firmly fixing the structure of the battery module assembly 20.

The terminal bus bar 40 mediates an electric connection between an electrode terminal 63, described later, and the battery module assembly. At this time, the battery modules 10 included in the battery module assembly 20 may be electrically connected to each other through electrode leads.

Figure 14:
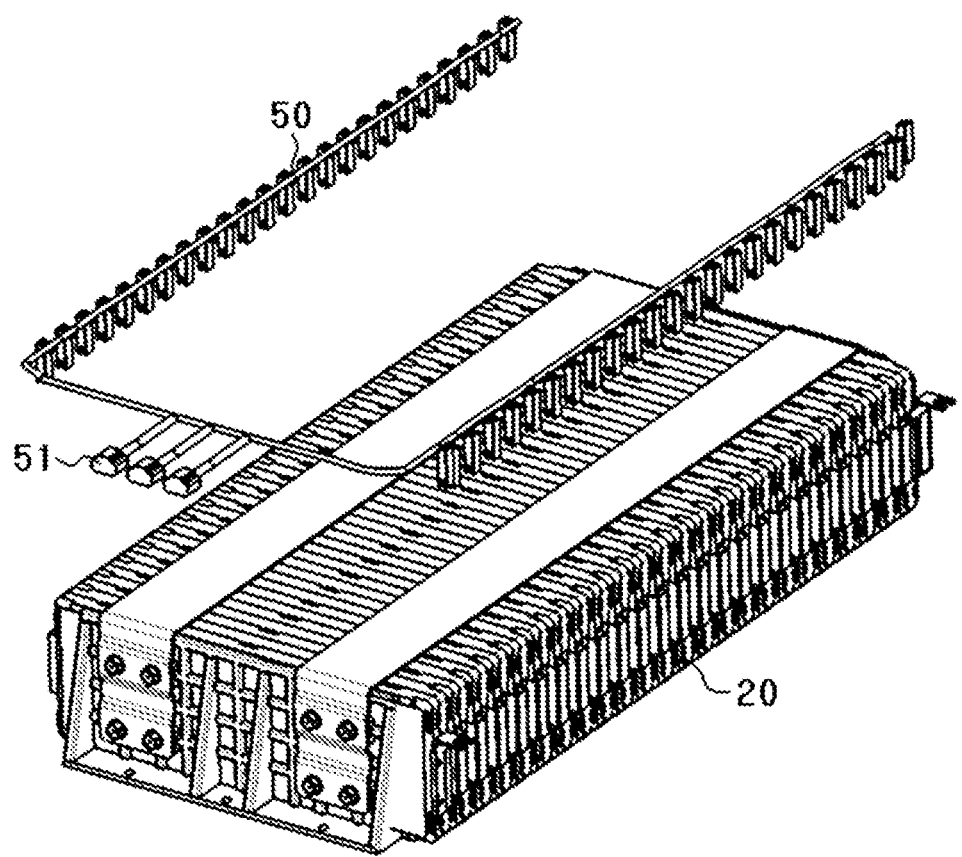
FIG. 14 is a diagram for illustrating a combination relation of a sensing line assembly and a battery module assembly according to another embodiment of the present disclosure.

FIG. 14 is a diagram for illustrating a combination relation of a sensing line assembly and a battery module assembly according to another embodiment of the present disclosure.

Referring to FIG. 14, the sensing line assembly 50 is electrically connected to electrode leads of all battery modules 10 included in the battery module assembly 20.

Here, the sensing line assembly 50 may include a connector 51 for coupling with an external measurement device.

The sensing line assembly 50 is used for an electric connection with a voltage measurement device for measuring a voltage of each battery module 10 included in the battery module assembly 20. The voltage measurement device may be connected through the connector 51, and the voltage measurement device may serve as a battery management system for controlling charge and discharge of the battery module array 100 according to the present disclosure.

Figure 15:
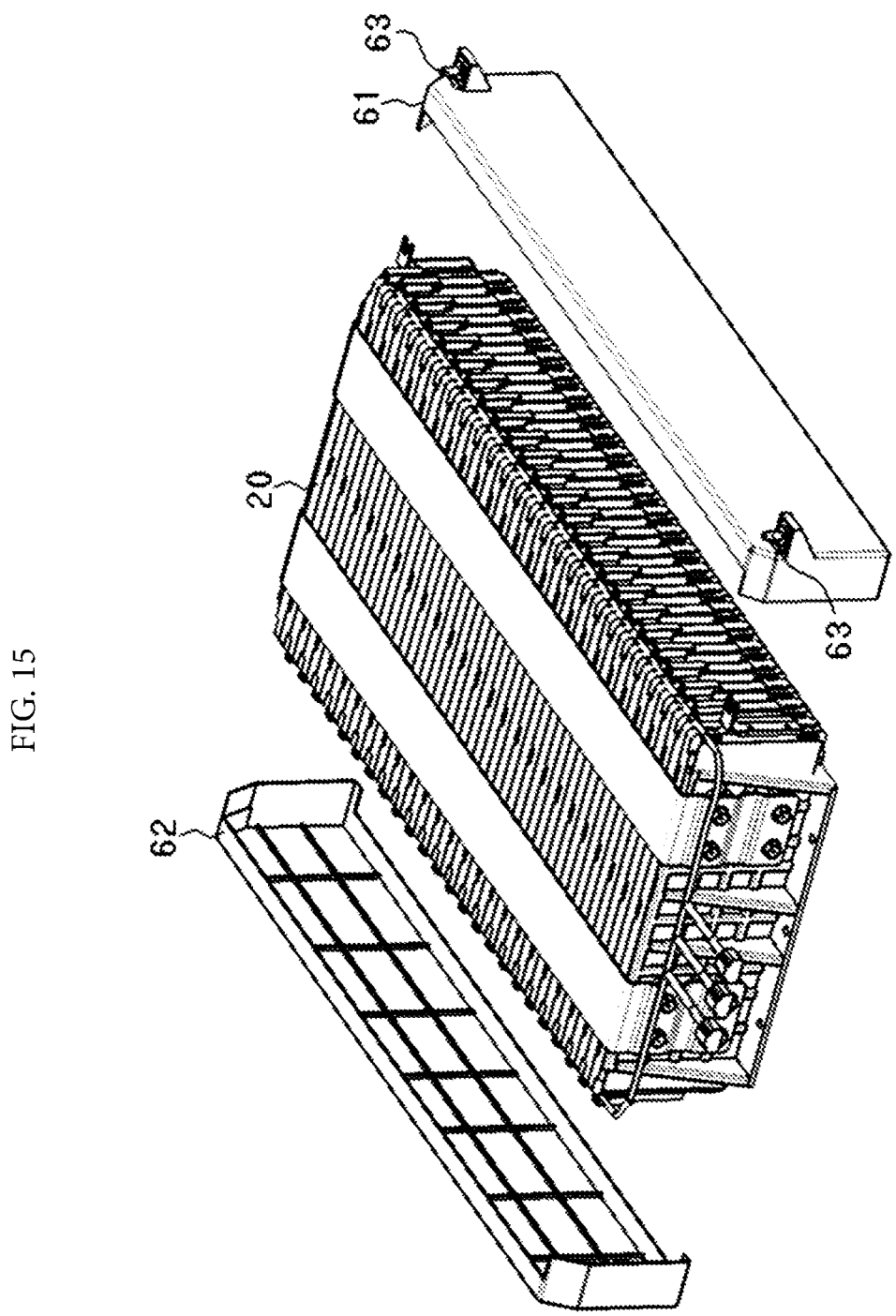
FIG. 15 is a diagram for illustrating a combination relation of a front cover, a rear cover and a battery module assembly according to another embodiment of the present disclosure.

FIG. 15 is a diagram for illustrating a combination relation of a front cover, a rear cover and a battery module assembly according to another embodiment of the present disclosure.

Referring to FIG. 15, the front cover 61 plays a role of covering a front portion of the battery module assembly 20 not to be exposed outwards. In other words, the front cover 61 is disposed at and coupled to the front portion of the battery module assembly 20 so as to cover the front portion of the battery module assembly 20. Similarly, the rear cover 62 plays a role of covering a rear portion of the battery module assembly 20 not to be exposed outwards. In other words, the rear cover 62 is disposed at and coupled to the rear portion of the battery module assembly 20 to cover the rear portion of the battery module assembly 20.

According to an embodiment of the present disclosure, the front cover 61 includes an electrode terminal 63 electrically connected to the terminal bus bar 40. In addition, the electrode terminal 63 is exposed at an outer surface of the front cover 61. The electrode terminal 63 is a terminal connected to an external device for charging or discharging the battery module array 100. A charging or discharging current flows through the electrode terminal 63.

Figure 16:
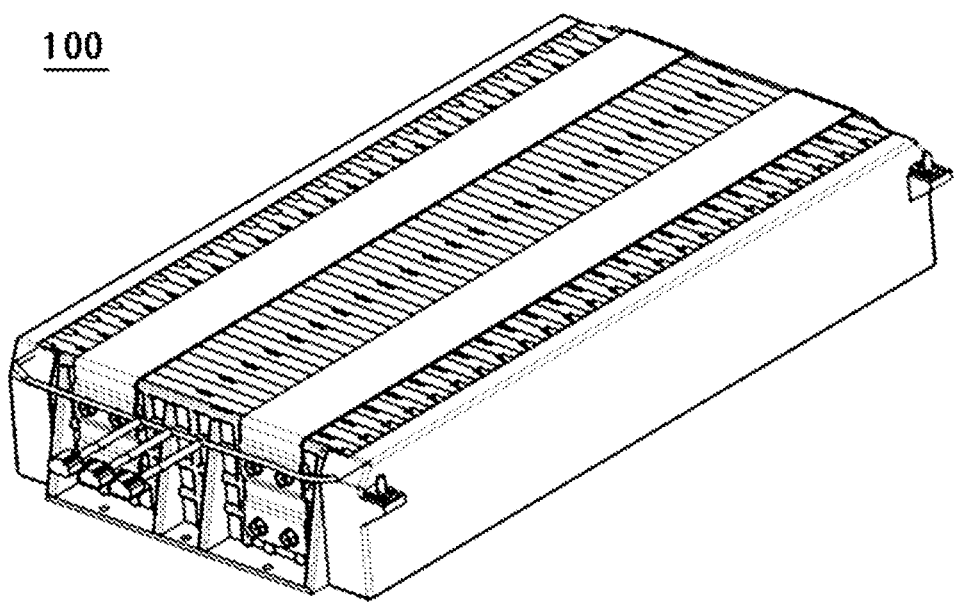
FIG. 16 is a perspective view showing a battery module array according to another embodiment of the present disclosure in an assembled state.

FIG. 16 is a perspective view showing a battery module array according to another embodiment of the present disclosure in an assembled state.

Referring to FIG. 16, a finished configuration of the battery module array 100 according to an embodiment of the present disclosure as described through FIGS. 9 to 15 may be found.

The battery module array 100 according to the present disclosure may serve as a component of a battery pack (not shown) which includes a battery module array 100 and a battery protection circuit (not shown).

The battery pack according to the present disclosure may serve as a component of a battery operating system including a battery pack and a load supplied with power from the battery pack 100. For example, the battery operating system may be an electric vehicle (EV), a hybrid electric vehicle (HEV), an electric bicycle (E-Bike), a power tool, an energy storage system, an uninterrupted power supply (UPS), a portable computer, a portable phone, a portable audio device, a portable video device or the like, and the load may be a motor for providing a rotating force with power supplied from the battery pack or a power conversion circuit for converting the power supplied by the battery pack into a power required for various circuit components.

According to the present disclosure, by configuring a battery module array with two-cell battery modules, it is possible to ensure high space utilization. In addition, by using standardized two-cell battery modules, it is possible to manufacture battery module arrays with various sizes and various charging/discharging capacity. In an aspect of the present disclosure, by using a single frame located at the center, serious manufacture costs are not demanded. In another aspect of the present disclosure, since the module frame is not couple to a cooling fin by means of extrusion, an allowance may be reduced during a manufacturing procedure. Therefore, in another aspect of the present disclosure, a non-contact area with a secondary battery cell, which may be caused by a bent cooling fin, may be decreased.

Meanwhile, a bolt or a nut groove may not be separately formed for coupling battery modules with each other, and thus the battery module array may be easily manufactured.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A battery module array, comprising:
   a plurality of battery modules, each having two secondary battery cells, a module frame and a cooling fin, each battery module having a first electrode lead extending from a front of the battery module and a second electrode lead extending from a rear of the battery module;
   end plates provided at both sides of a battery module assembly configured by assembling the plurality of battery modules;
   a '['-shaped tension bar coming in contact with a top end of the battery module assembly and fixed to the end plates;
   a U-shaped sensing line assembly having a central portion, a first side and a second side and a first plurality of connectors connected to and extending from the first side to electrically connect to the first electrode leads of the battery modules and a second plurality of the connectors connected to and extending from the second side to electrically connect to the second electrode leads of the battery modules;
   a terminal bus bar configured to electrically connect the electrode leads of the battery modules included in the battery module assembly to each other;
   a front cover configured to cover an entire front surface of the battery module assembly; and
   a rear cover configured to cover an entire rear surface of the battery module assembly,
   wherein the front cover and rear cover extend between the end plates,
   wherein the central portion of the sensing line assembly extends over an outside surface of one of the end plates and between the front cover and rear cover,
   wherein the plurality of battery modules are stacked in a first direction extending between the end plates,
   wherein the first side of the sensing line assembly extends from the central portion in the first direction and directly contacts electrode leads of the front surface of the battery module assembly, the first side of the sensing line assembly being between the battery module assembly and the front cover, and
   wherein the second side of the sensing line assembly extends from the central portion in the first direction and directly contacts electrode leads of the rear surface of the battery module assembly, the second side of the sensing line assembly being between the battery module assembly and the rear cover.

2. The battery module array according to claim 1, wherein the module frame has a rectangular frame shape, has a slit formed at a bottom surface thereof so that the cooling fin is inserted therein, and is interposed between the two secondary battery cells.

3. The battery module array according to claim 1, wherein the module frame has a rectangular frame shape, has a side to which the cooling fin is coupled, and is configured to surround outer surfaces of the two secondary battery cells.

4. The battery module array according to claim 1, wherein the battery module array further includes an insulation sheet interposed between the battery module assembly and the end plate.

5. The battery module array according to claim 4, wherein the insulation sheet is made of ethylene propylene diene monomer (EPDM) rubber.

6. The battery module array according to claim 1, wherein the end plate has a groove in which a thread is formed,
   wherein the tension bar has a groove formed at a location corresponding to the groove of the end plate, and
   wherein the end plate and the tension bar are fixed to each other by means of a bolt.

7. The battery module array according to claim 1, wherein the central portion of the sensing line assembly includes a connector for coupling with an external device.

8. The battery module array according to claim 1, further comprising an electrode terminal on an exterior surface of the front cover, the electrode terminal electrically connected to the terminal bus bar.

9. A battery pack, comprising:
   a battery module array defined in claim 1; and
   a battery protection circuit.

10. A battery operating system, comprising:
    a battery pack defined in the claim 9; and
    a load configured to receive power from the battery pack.

11. The battery operating system according to claim 10, wherein the load is an electric-driven unit or a portable device.

12. The battery module array according to claim 1, wherein the sensing line assembly further comprises a connector for coupling with an external measurement device between the first side and the second side.

13. A battery module array, comprising:
    a plurality of battery modules forming a battery module assembly, each battery module having two secondary battery cells, a module frame and a cooling fin, each battery module having a first electrode lead extending from a front of the battery module and a second electrode lead extending from a rear of the battery module;
    a housing encasing the battery modules assembly having a front cover, a rear cover and a pair of end plates; and a U-shaped sensing line assembly having a central portion, a first side and a second side and a first line of connectors connected to and extending from the first side and electrically connected to the first electrode leads of the battery modules and a second line of connectors connected to and extending from the second side and electrically connected to the second electrode leads of the battery modules, wherein the front cover covers an entire front surface of the battery module assembly, wherein the rear cover covers an entire rear surface of the battery module assembly, wherein the front cover and rear cover extend between the end plates, wherein the central portion of the sensing line assembly extends over an outside surface of one of the end plates and between the front cover and rear cover, wherein the plurality of battery modules are stacked in a first direction extending between the end plates, wherein the first side of the sensing line assembly extends from the central portion in the first direction and directly contacts electrode leads of the front surface of the battery module assembly, the first side being between the battery of the sensing line assembly and the front cover, and wherein the second side of the sensing line assembly extends from the central portion in the first direction and directly contacts electrode leads of the rear surface of the battery module assembly, the second side of the sensing line assembly being between the battery of the sensing line assembly and the rear cover.

14. The battery module array according to claim 13, wherein the central portion of the sensing line assembly further comprises a connector for coupling with an external measurement device between the first side and the second side.

15. The battery module array according to claim 1, wherein the sensing line assembly comprises a single line, and wherein the single line electrically connected to electrode leads of the plurality of battery modules.

16. The battery module array according to claim 13, wherein the sensing line assembly comprises a single line, and wherein the single line is electrically connected to electrode leads of the plurality of battery modules.

* * * * *